United States Patent [19]
Markusson

[11] Patent Number: 4,681,488
[45] Date of Patent: Jul. 21, 1987

[54] CUTTING INSERT

[75] Inventor: Lars O. Markusson, Sandviken, Sweden

[73] Assignee: Santrade Limited, Lucerne, Switzerland

[21] Appl. No.: 880,062

[22] Filed: Jun. 30, 1986

[30] Foreign Application Priority Data

Jul. 3, 1985 [SE] Sweden ............................ 8503304

[51] Int. Cl.⁴ .......................... B23B 27/16; B23C 5/20
[52] U.S. Cl. ....................................... 407/114; 407/113
[58] Field of Search ................ 407/113, 114, 115, 116

[56] References Cited

U.S. PATENT DOCUMENTS

| | | | |
|---|---|---|---|
| 3,955,259 | 5/1976 | Gustafsson | 407/113 |
| 4,090,801 | 5/1978 | Faber | 407/113 |
| 4,616,962 | 10/1986 | Ushijima et al. | 407/114 |

FOREIGN PATENT DOCUMENTS

| | | | |
|---|---|---|---|
| 2252511 | 6/1973 | Fed. Rep. of Germany | 407/114 |
| 2938381 | 4/1980 | Fed. Rep. of Germany | 407/113 |
| 3332821 | 5/1984 | Fed. Rep. of Germany | . |
| 472258 | 5/1969 | Switzerland | . |
| 951624 | 3/1964 | United Kingdom | 407/113 |
| 1474361 | 5/1977 | United Kingdom | . |
| 848152 | 7/1981 | U.S.S.R. | 407/113 |

OTHER PUBLICATIONS

Article, "Verkstadsteknisk Ordlista Skarande Bearbetning" (Glossary of Workshop Engineering), (Cutting Methods and Tools) SMS Handbook, 508, p. 40.
Article-CIRP, vol. 33/1/1984, "The Exit Failure of Cemented Carbide Face Milling Cutters—Part I—Fundamentals and Phenomenae", pp. 47-51.

Primary Examiner—M. Jordan
Assistant Examiner—Jerry Kearns
Attorney, Agent, or Firm—Burns, Doane, Swecker & Mathis

[57] ABSTRACT

The invention relates to an indexable cutting insert having a polygonal basic shape for chip forming machining, preferably for milling. The insert comprises an upper face and a lower face and edge surfaces connecting them. Each corner portion of the insert comprises a plurality of chamfers arranged at the transition between the connected edge surfaces, a first chamfer of which forms a minor cutting edge at the line of intersection with the upper face. At least two further planar, second chamfers are arranged between the first chamfer and the associated edge surface, said second chamfers forming an obtuseinternal angle with each other and forming cutting edges with the upper face and therefore the cut chip avoids compressing and avoids a quick destruction of the corner portions of the insert.

9 Claims, 14 Drawing Figures

CUTTING INSERT

BACKGROUND OF THE INVENTION

The present invention relates to a cutting insert having a polygonal basic shape, for chip forming machining, preferably milling, comprising two mainly parallel faces and edge surfaces connecting them. Lines of intersection between two edge surfaces and at least one face form main cutting edges. A plurality of chamfers are formed at the transition between said edge surfaces in a corner portion of the insert. A first chamfer forms a minor cutting edge at its line of intersection with said face.

It is previously known at inserts for milling to provide the corner portions of the insert with a corner chamfer between associated minor and main cutting edges, the external angle between said minor cutting edge and said main cutting edge being approximately half as large as the external angle between the minor cutting edge and the main cutting edge. This geometry gives a relatively sharp corner between the corner chamfer and the main cutting edge. During milling operations the chip is forced perpendicularly to each active cutting edge and therefore the part of the chip generated by the main cutting edge collides with the part of the chip generated by the corner chamfer. The sharp corner between the corner chamfer and the main cutting edge is thus exposed to an increased load relative to the corner chamfer and the main cutting edge and thus becomes the part of the insert which firstly is cracked or deformed. It is also known to provide the transition between the minor cutting edge and the main cutting edge with a rounded-off portion, having a constant radius. Since the generated chip is guided perpendicularly to the edge of the portion and the main cutting edge also in this case a compression of the chip arises at the transition between the rounded-off portion and the main cutting edge.

The present invention relates to a cutting insert through which shape the above-mentioned drawback is avoided. A favourable upset of the chip is achieved at the cutting edges of the corner portion and reduced forces are achieved at the corner between the corner chamfer and the main cutting edge during the machining.

THE DRAWINGS

The invention will be more closely described hereinafter with reference to the appended drawings wherein further characterizing features and advantages will become apparent

DESCRIPTION OF PREFERRED EMBODIMENTS OF THE INVENTION

Figure 1:
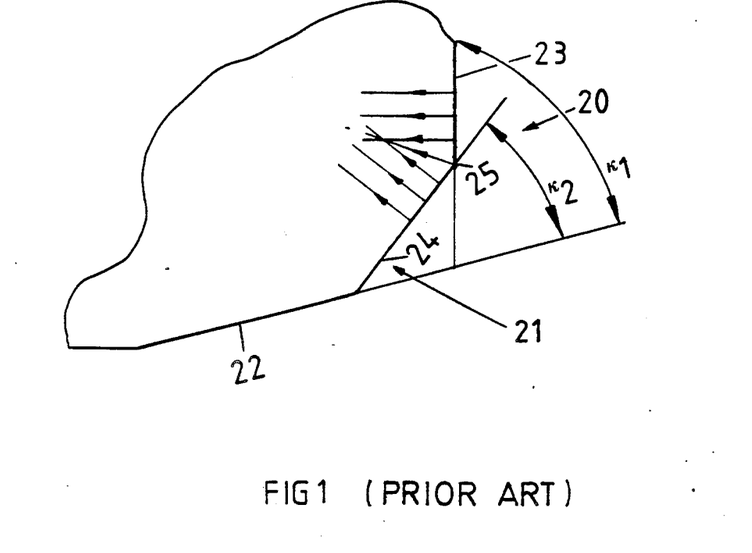
FIG. 1 shows a corner portion of a conventional cutting insert, in plan view.

FIG. 1 shows a corner portion of a conventional insert for flat face milling. A corner chamfer 21 has been formed at the corner portion, between a minor cutting edge 22 and an associated main cutting edge 23. The main cutting angle $K_2$ between the edge 24 of the corner chamfer 21 and the minor cutting edge is approximately half as large as the cutting angle $K_1$ between the minor cutting edge and the main cutting edge. This geometry gives a relatively sharp corner 25 between the corner chamfer and the main cutting edge. During the milling operation the chip is forced perpendicularly away from each active cutting edge, see arrows, and therefore the part of the chip which is generated by the main cutting edge 23 meets the part of the chip which is generated by the corner chamfer 21. The sharp corner 25 between the corner chamfer and main cutting edge is thereby exposed to an increased load relative to the corner chamfer and the main cutting edge and thus becomes the part of the insert which firstly breaks or is deformed.

FIGS. 2 to 5 show an embodiment of an indexable cutting insert according to the invention. The indexable cutting insert 10 has a square basic shape and comprises a mainly planar upper face 11, a mainly planar lower face 12 and edge surfaces 13,14,15,16 connecting them. The indexable cutting insert has a positive geometry, i.e. each edge surface forms an acute angle with the upper face 11. The insert may be formed negative, i.e. the edge surfaces connect the upper and lower faces perpendicularly. The lines of intersection between the planar parts of the edge surfaces 13 to 16 and the upper face 11 form main cutting edges 40.

The corner portions on the insert are identically shaped and therefore only one corner is described hereinafter. A plurality of chamfers are formed in the corner portion which is surrounded by the edge surfaces 13 and 14. The edge surface 13 is broken inwardly towards the insert by a first planar chamfer 41 whose line of intersection with the upper face 11 forms a minor cutting edge 42, provided to generate the work piece surface. The minor cutting edge 42 is at least three times the length of the main cutting edge 40. The first chamfer 41 is broken at its other end by a second chamfer 43 defined by $K_2$ whose line of intersection with the upper face form a cutting edge 45. The internal angle between these chamfers is chosen within the interval 130 to 170°.

The second chamfer 43 is smoothly broken by a third chamfer 46, defined by $K_3$ whose line of intersection with the upper side forms the cutting edge 47. Each cutting edge 45, 47 has a theoretical length L, see FIG. 5, which is defined by the distance between two adjacent break points. The straight cutting edges 45, 47 form an obtuse internal angle of about 140° to 175°. The third chamfer 46 smoothly transites into the edge surface 14.

Figure 5:
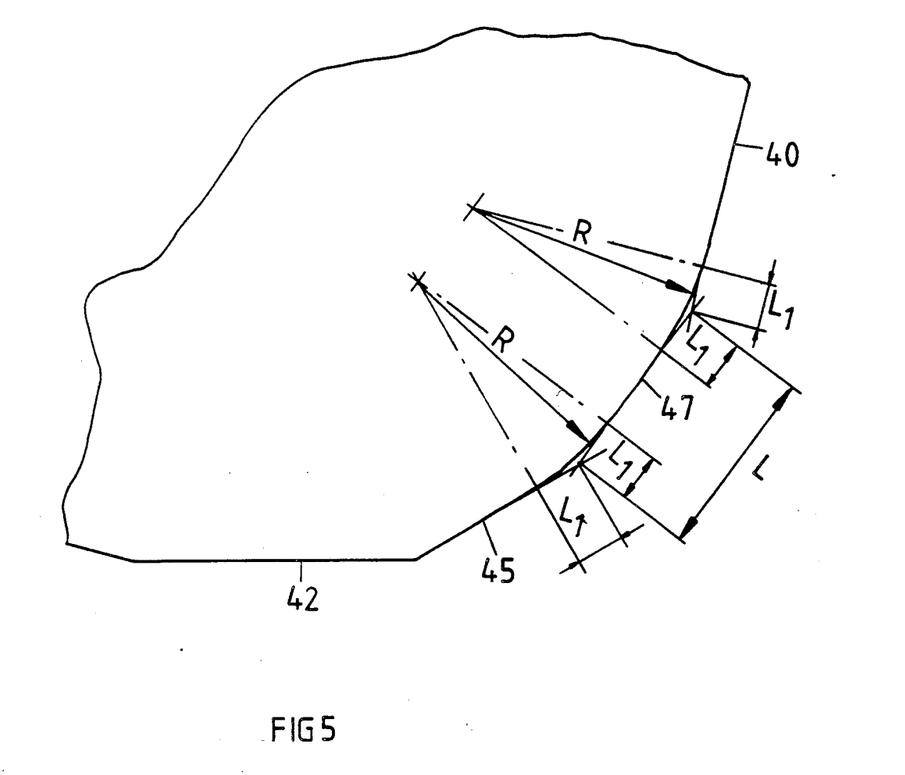
FIG. 5 shows a corner portion of the indexable cutting insert, in magnification.

Each smooth transition between two straight portions has the shape of a segment of a circle and thus has a constant radius R of curvature, which is at least half of and maximum six times the theoretical length L of the cutting edge 45 or 47. The segment of the circle touches the straight portions for example the edge 47 and the edge 45 at a distance $L_1$ from the theoretical break point between two straight, adjacent portions and at opposite sides of the break point. The third chamfer 46 and the edge surface 14 form an obtuse internal angle of 140 to 175°. The major part of the minor cutting edge 42 is placed at one side of a bisector B of the cutting corner. The major part of the cutting edges 45,47 of the second chamfers 43, 46 are placed at the opposite side of said bisector. The main cutting edge 40 extends from the curved connection with the third chamfer to the minor cutting edge of the adjacent cutting corner. The length of the minor cutting edge 42 is approximately equal to the total length of the transition edges between the minor and main cutting edges.

Figure 2:
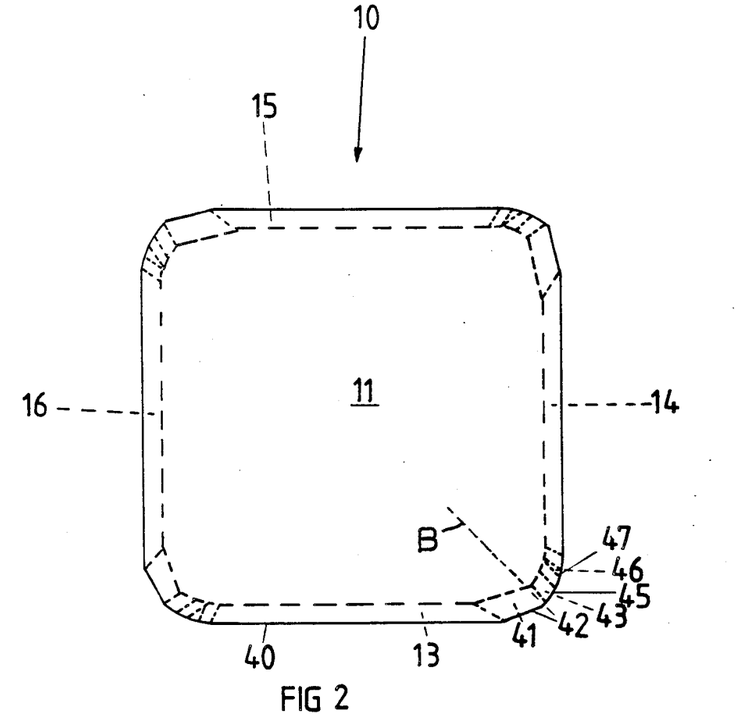
FIG. 2 shows an embodiment of an indexable cutting insert according to the invention in plan view.
Figure 3:
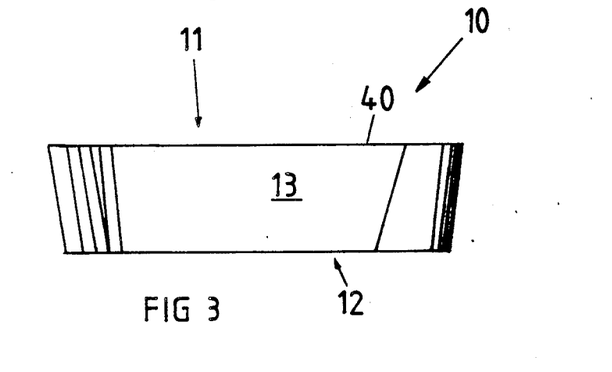
FIG. 3 shows the indexable cutting insert in side view.
Figure 4:
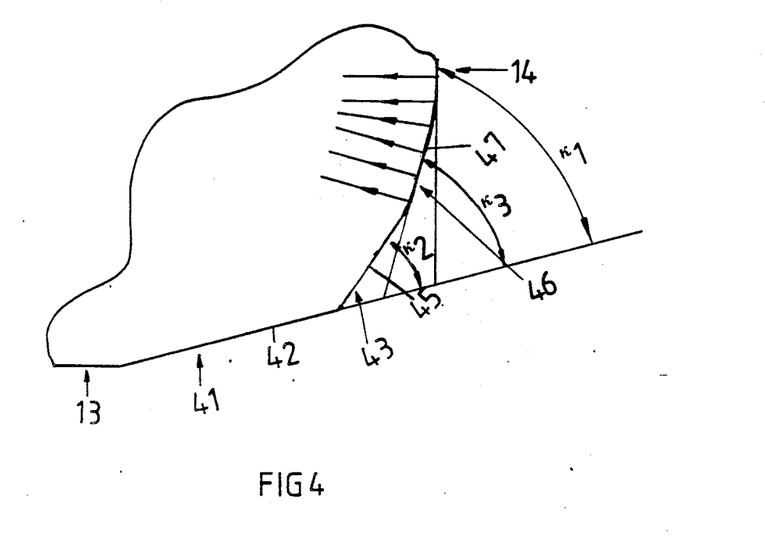
FIG. 4 shows a corner portion of the indexable cutting insert, in magnification.

The conventional insert of FIG. 1 was compared with the insert of FIG. 2 according to the invention in a face milling wear test in accordance with A. J. Pekelharing in Annals of the CIRP Vol. 33/1/1984 pages 47 and 48 (Fig. a1). The conditions of the two kinds of inserts were identical during the test. The milled length was maximum 600 mm and one insert was used during each test.

Four of fourteen tested conventional inserts were damaged at the cutting corner while none of the fourteen inserts according to the present invention was damaged during the test.

This configuration of the corner portion results in that the chip which is generated by the cutting edges of the corner portion and which has a direction of flow perpendicular to respective cutting edge in the corner portion is less compressed than that of the insert according to FIG. 1. The insert according to the present configuration present a more even load on the cutting edges and discloses a better toughness during the machining.

Figure 6:
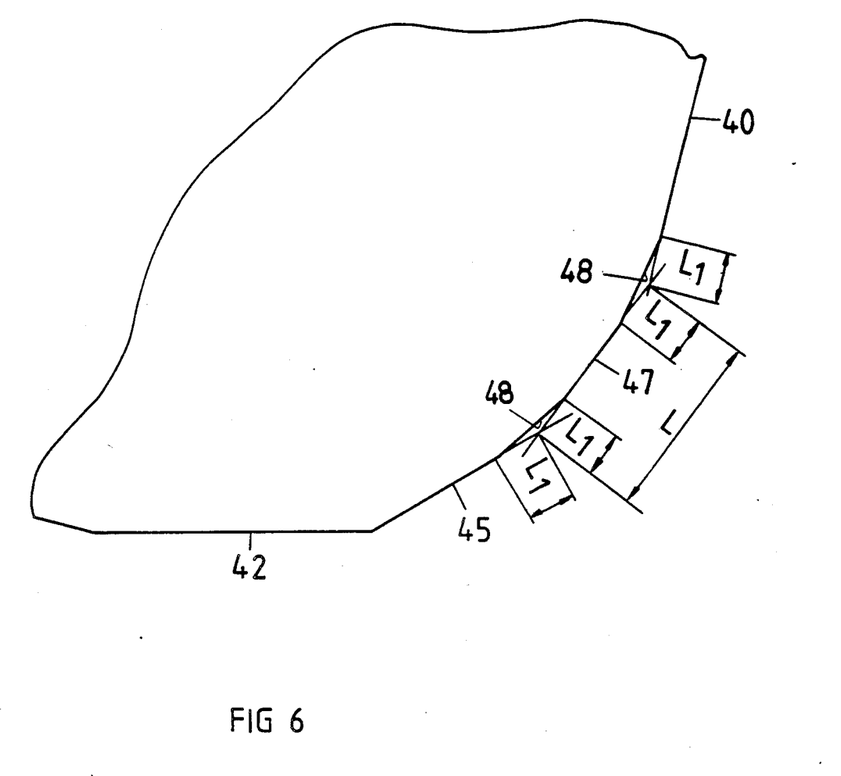
FIG. 6 shows an alternative embodiment of the corner portion of an insert in a plan view.

Alternatively the straight portions 47, 45 may be connected by a straight edge 48 according to FIG. 6 which breaks respective cutting edge 47, 45 at a distance $L_1$ from the theoretical break point of the cutting edges. The distance $L_1$ is approximately a fourth of the theoretical length L of the cutting edge.

Figure 7:
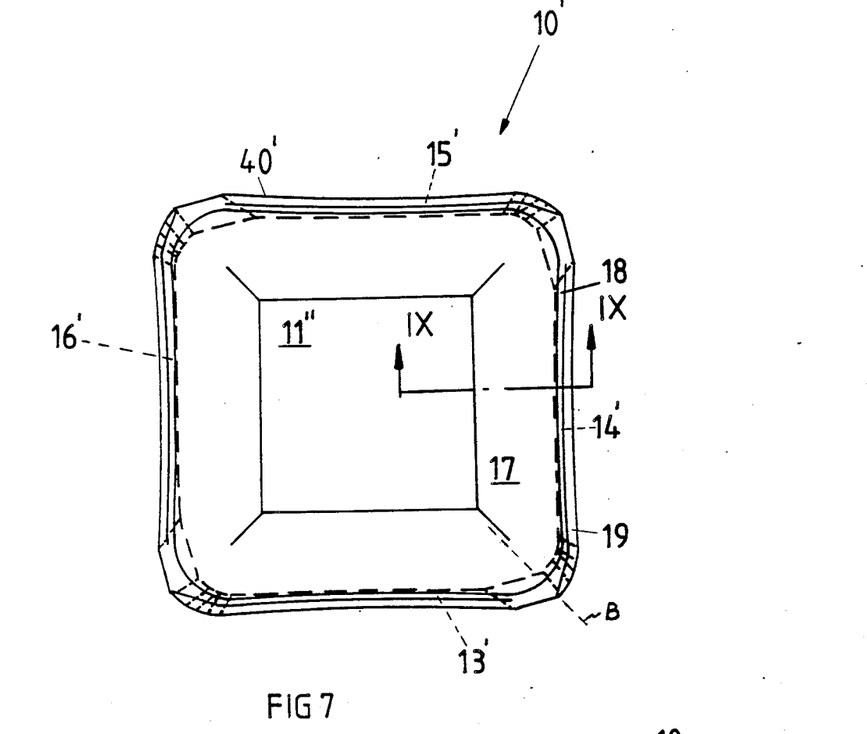
FIG. 7 shows an alternative embodiment of an indexable cutting insert according to the invention in a plan view.
Figure 8:
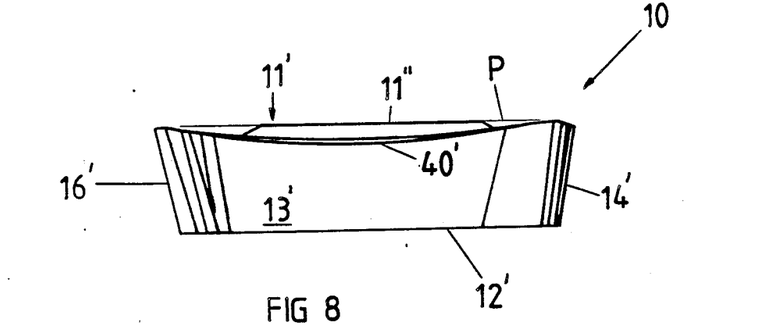
FIG. 8 shows a side view of the insert in FIG. 7.
Figure 9:
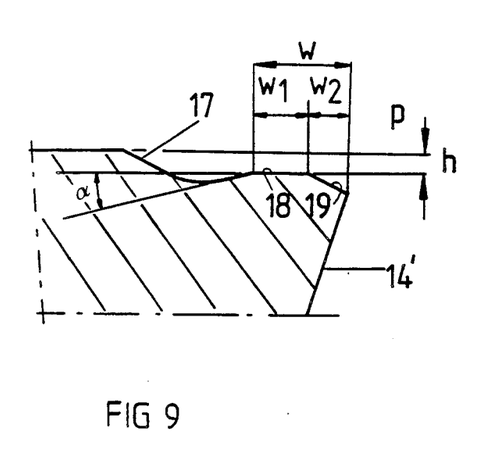
FIG. 9 shows a cross-section of the insert according to the line IX—IX in FIG. 7.
Figure 10:
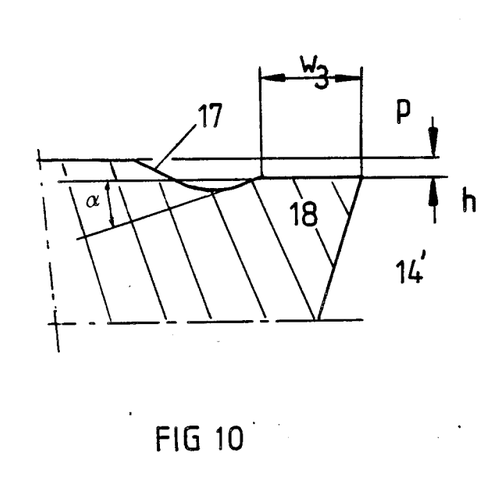
FIG. 10 shows a cross-section of a further embodiment of an indexable cutting insert according to the invention.
Figure 11:
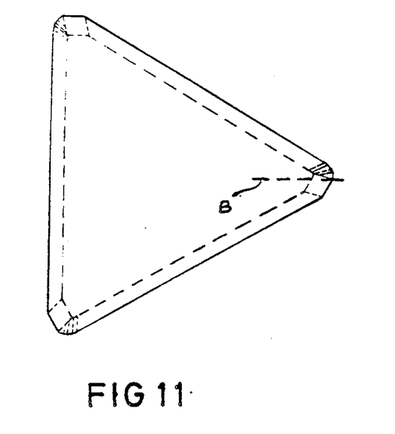
FIGS. 11 and 12 show a further embodiment of an indexable cutting insert according to the invention in a plan view and a side view, respectively.
Figure 12:
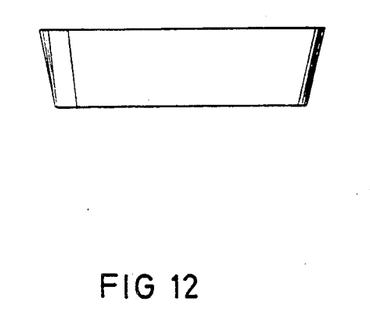
Figure 13:
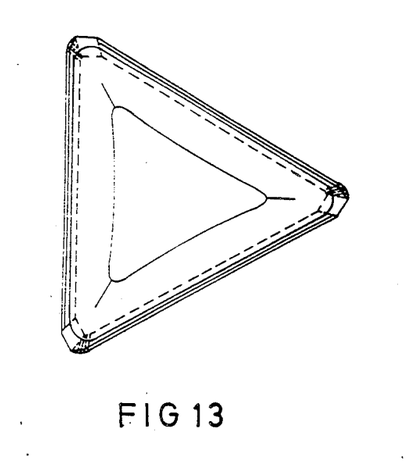
FIGS. 13 and 14 show still a further embodiment of an indexable cutting insert according to the invention in a plan view and a side view, respectively.
Figure 14:
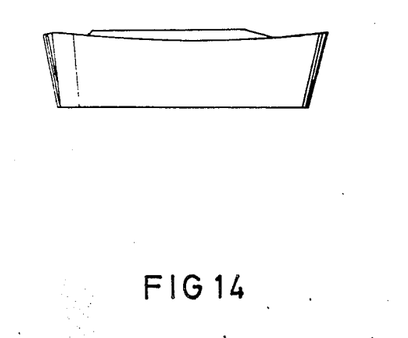

FIGS. 7 to 9 show another embodiment of an indexable cutting insert according to the invention. The indexable cutting insert 10' has a square basic shape and comprises a mainly planar upper face 11', a mainly planar lower face 12' and edge surface 13',14',15',16' connecting them. By the word "upper face" is meant the plane which is formed by the points or areas at the periphery of the insert which are arranged furthest away from the opposite face. The indexable cutting insert has a positive geometry, i.e. each edge surface forms an acute internal angle with the plane P of the upper face. The insert may also be shaped negative, i.e. the edge surfaces connect the upper and lower faces perpendicularly. A concave recess 17 is formed around the mid portion 11'' of the upper face. The concave recess 17 extends from the mid portion 11'' to a curved circumferential portion 18 between two adjacent corner portions. The center of the portion 18 is arranged at a distance h from the plane P of the upper face. The distance h varies depending on where the cross-section is taken. The curved portion 18 which has a width $W_1$ is bordered outwardly by an other curved portion 19 which constitutes a strengthening bevel for the cutting edges defined by the lines of intersection between the strengthening bevel and the edge surfaces 13'-16'. The strengtening bevel 19 extends along all cutting edges except along the minor cutting edges, which are formed at the line of intersection between the portions 18 and the first chamfers. The strengthening bevel has the width $W_2$ which with the curved portion 18 forms a total width W parallel with the plane P. Alternatively the curved inner portion 18, see FIG. 10, may extend outwardly to the edge surface 14' and then it has a width $W_3$ a little more than W. The width $W_3$ is larger than the recommended tooth feed for the insert preferably twice as large. With this geometry even lower cutting forces are achieved during the milling operation compared with the insert in FIGS. 2-6. The part of the recess 17 climbing towards the mid portion 11'' of the upper face 11' is arranged to bend away the cut chip such that this will not hit against the milling cutter body. Said part mainly has no chip breaking function. The part of the groove 17 climbing towards the portion 18 forms an angle $\alpha$, between 5°-30° with the portion.

The lines of intersection between the planar portions of the edge surfaces 13'-16' and the portion 18 or 19 form main cutting edges 40'. Each main cutting edge 40' is curved such that its center is arranged closer to the lower face of the insert than the ends of the edge. This shape of the edge 40' means a built-in, large inclination angle in the insert and therefore the axial cutting forces are reduced during the milling operation.

The chamfers at the corner portions are identical with the ones shown in FIGS. 2 to 6.

FIGS. 11, 12 and 13, 14 show two triangular versions of the indexable cutting inserts shown in FIG. 2-5, and FIGS. 7 to 10. The difference from the inserts shown in these figures lies only in that the main cutting edges of the triangular inserts meet in respective corner portion under a more acute internal angle, such that each minor cutting edge becomes mainly perpendicular to the associated main cutting edge. Alternatively the corner portions may be formed in accordance with FIG. 6. The insert according to FIGS. 13 and 14 has a cross section in accordance with FIG. 9 but may alternatively have a cross section according to FIG. 10.

Thus the invention relates to an indexable cutting insert through which shape a strong insert is achived. Furthermore the point load on the insert corner is reduced and the cutting forces during the machining are reduced.

I claim:

1. A cutting insert for chip forming machining having a polygonal basic shape, comprising two mainly parallel faces and edge surfaces joining them, lines of intersection between two of said edge surfaces and at least one of said faces forming main cutting edges and a plurality of chamfers being formed at the transition between two of said edge surfaces in a cormer portion of the insert, a first of said chamfers forming a minor cutting edge at its line of intersection with said face, said cormer portion having a bisector, characterized in that the transition between the minor cutting edge and the associated main cutting edge in the corner portion of the insert comprises at least two straight cutting edges which form an obtuse internal angle with each other, said main cutting edge being essentially longer than the associated minor cutting edge, the major part of said minor cutting edge being placed at one side of said bisector and the major part of the cutting edges of the second chamfers along intersection lines with said face being arranged at the opposite side of said bisector and in that the main cutting edge extends from a cutting edge of a second chamfer to a minor cutting edge at an adjacent corner portion and in that at least two maximum four second chamfers are formed between the first chamfer and the associated edge surface.

2. Cutting insert according to claim 1, characterized in that the transition between the minor cutting edge and the associated main cutting edge in the corner portion of the insert comprises alternating straight and curved cutting edges.

3. Cutting insert according to claim 1, characterized in that the second chamfers, form mainly straight cutting edges at the lines of intersection with the face, whose extension lines form discretely, increasing, acute angles with the minor cutting edge or its extension line, a transition between two adjacent cutting edges of said second chamfers forming a convexly curved cutting edge and the transition between the cutting edge of a second of said chamfers and an associated main cutting edge forming a convexly curved cutting edge.

4. Cutting insert according to claim 3, characterized in that the cutting edge of each second chamfer has a theoretical length and in that each convex cutting edge is curved such that it touches the cutting of the adjacent second chamfer at a distance from the theoretical intersection point between two second chamfers which is approximately a fourth of the theoretical length.

5. Cutting insert according to claim 3, characterized in that the radius of curvature of each curved cutting edge is at least half and maximum six times the theoretical length of the cutting edge.

6. Cutting insert according to claim 1, characterized in that at least two and maximum four second chamfers are formed between the first chamfer and the associated edge surface, forming mainly straight cutting edges at the lines of intersection with the side, whose extension lines form discretely increasing acute angles with the associated minor cutting edges or its extension line, a transition between two adjacent cutting edges of said second chamfers forming a straight cutting edge.

7. Cutting insert according to claim 1, characterized in that the main cutting edge in side projection is arch-shaped, the center of said main cutting edge having a less distance to the opposite face than the distance from the end portions of the main cutting edge to said face.

8. Cutting insert according to claim 7, characterized in that a concave recess is formed inside the main cutting edge, which extends from the mid-portion of the upper face towards a curved, circumferential first bevel portion directly or indirectly connected to the edge surfaces, the center of said first bevel being curved equal to the associated main cutting edge.

9. Cutting insert according to claim 8, characterized in that an outer curved second bevel is arranged between the first bevel and the associated edge surface, said second bevel being curved equal to the first bevel.

* * * * *